United States Patent
Bishop

(10) Patent No.: US 6,548,184 B1
(45) Date of Patent: Apr. 15, 2003

(54) JOINT FOR SHEET MATERIAL AND A METHOD OF JOINING SHEET MATERIAL

(75) Inventor: Jeffrey C Bishop, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/720,780

(22) PCT Filed: Jul. 2, 1999

(86) PCT No.: PCT/GB99/02128

§ 371 (c)(1),
(2), (4) Date: Dec. 29, 2000

(87) PCT Pub. No.: WO00/04295

PCT Pub. Date: Jan. 27, 2000

(30) Foreign Application Priority Data

Jul. 18, 1999 (GB) ............................................... 9815606

(51) Int. Cl.⁷ .......................... F16B 17/00; B21D 39/03
(52) U.S. Cl. ......................... 428/582; 428/598; 29/505; 29/513; 29/521
(58) Field of Search ................................ 428/598, 596, 428/582, 597; 403/274; 29/505, 513, 521; 219/121.67

(56) References Cited

U.S. PATENT DOCUMENTS

| | | | | |
|---|---|---|---|---|
| 1,791,956 A | * | 2/1931 | Cowles | 119/431 |
| 2,722,625 A | * | 11/1955 | Bingeman et al. | 220/615 |
| 2,869,107 A | * | 1/1959 | Engel | 439/82 |
| 3,280,359 A | * | 10/1966 | Maloney et al. | 313/240 |
| 4,600,140 A | * | 7/1986 | Milliens | 206/140 |
| 4,691,765 A | * | 9/1987 | Wozniczka | 165/185 |
| 5,221,585 A | | 6/1993 | Kresse | |
| 6,269,906 B1 | * | 8/2001 | Dockter et al. | 182/92 |
| 2001/0009642 A1 | * | 7/2001 | Holme et al. | 415/198.1 |

FOREIGN PATENT DOCUMENTS

| | | |
|---|---|---|
| DE | 1 134 557 A US | 8/1962 |
| DE | 35 06 860 A | 8/1986 |
| DE | 297 20 207 A | 3/1998 |
| EP | 0232799 * | 8/1987 |
| EP | 0 538 223 A | 4/1993 |
| FR | 1 500 021 P | 9/1967 |
| GB | 555061 SP | 8/1943 |
| GB | 845233 SP | 8/1960 |
| GB | 1 578 682 SP | 11/1980 |
| GB | 2 111 161 A | 6/1983 |
| JP | 7-30277 * | 1/1995 |
| WO | PCT/US97/14067 A | 3/1998 |

* cited by examiner

*Primary Examiner*—John J. Zimmerman
(74) *Attorney, Agent, or Firm*—W. Warren Taltavull; Manelli, Denison & Selter, PLLC

(57) ABSTRACT

A joint for joining a first metal sheet (10) to a second metal sheet (30) comprises a plurality of projections (18) on the edge (12) of the first metal sheet (10). The projections (18) are symmetrical about a plane extending perpendicularly to the plane of the first metal sheet (10). The symmetrical projections (18) are rotatable about an axis (X), the axis (X) is arranged in the plane of the first metal sheet (10) and in the plane extending perpendicularly to the first metal sheet (10). A plurality of slots (32) are provided through the second metal sheet (30). The symmetrical projections (18) extend through the slots (32) in the second metal sheet (30) and the symmetrical projections (18) are rotated such that the symmetrical projections (18) are arranged in the plane perpendicular to the plane of the first metal sheet (10) to clamp the second metal sheet (30) between the edge (12) of the first metal sheet (10) and symmetrical projections (18).

26 Claims, 4 Drawing Sheets

JOINT FOR SHEET MATERIAL AND A METHOD OF JOINING SHEET MATERIAL

FIELD OF THE INVENTION

The present invention relates to joints for sheet material and to methods of joining sheet material, and in particular to joints for sheet metal and to method of joining sheet metal.

BACKGROUND OF THE INVENTION

It is known to join sheet metal components by welding an edge of one sheet metal component to the face of an adjacent sheet metal component, or by firstly bending over the end of one sheet metal component and welding the face of the bent over end of the first sheet metal component to the face of an adjacent sheet metal component. It is known that other types of bonding may be used for example brazing, soldering or adhesive.

It is also known to join sheet metal components by firstly bending over the end of one sheet metal component and riveting the face of the bent over end of the first sheet metal component to the face of an adjacent sheet metal component. It is also known that other types of mechanical attachment may be used for example nuts and bolts.

It is further known to join sheet metal components by firstly providing one or more projections from the edge of one of the sheet metal components, providing a corresponding number of slots through the adjacent sheet metal component and passing the projections on the first sheet metal component through the slats in the adjacent sheet metal component. It is known that the projections are then either bent over to abut the opposite face of the adjacent sheet metal component or the projections are twisted to prevent the projection withdrawing from the slot.

A problem with the welded, brazed or soldered joint is that these are hot joining processes which many require subsequent costly heat treatments of the sheet metal components.

A problem with the fold over projection joint or the twist projection joint is that they are not used in joints which are required to transmit or resist external loads. The fold over projection joint or the twist projection joint are normally used to simply maintain the relative positions of an assembly of sheet metal components. The fold over projection and twist projection have a tendency to unfold, untwist or deform such that the joint becomes loose.

SUMMARY OF THE INVENTION

FR1500021 discloses fastening a printed circuit board to a metallic sheet. The metallic sheet has projections which extend from the edge of the metallic sheet. The projections extend through slots in the printed circuit board and the projections are rotatable to fasten the printed circuit board onto the metallic sheet. The projection has a root which extends a predetermined distance from the edge of the metallic sheet into the main body of the metallic sheet. The printed circuit board is also spaced from the edge of the metallic sheet by other projections.

WO9812437 discloses joining metallic sheets. A first metallic sheet has projections which extend from the edge of the first metallic sheet. The projections extend through slots in the second metallic sheet and the projections has a twist tab which is to hold the second metallic sheet on the first metallic sheet. The projection has an alignment member which fits in the slot to relatively Locate the first and second metallic sheets. The twist tab is secured to the alignment member. Once the metallic sheets have been welded together the twist tab is broken off.

The present invention seeks to provide a twist projection joint for sheet metal which overcomes, or reduces, the above mentioned problems.

Accordingly the present invention provides a joint for joining a first ductile sheet to another structure comprising at least one projection on an edge of the first ductile sheet, the at least one projection being rotatable about an axis, the axis being arranged in the plane of the first ductile sheet and in a plane extending perpendicularly to the edge of the first ductile sheet, at least one slot extending through the other structure, the at least one projection extending through the at least one slot in the other structure, the at least one projection being rotated such that the at least one projection is in a plane arranged at angle to the plane of the first ductile sheet and the at least one projection abuts the other structure at both sides of the slot to clamp the other structure between the edge of the first ductile sheet and the at least one projection, the at least one projection comprises a root portion which extends from the projection into the main body of the first ductile sheet, the root portion extends for a predetermined distance from the edge of the first ductile sheet into the main portion of the first ductile sheet, characterised in that there is at least one additional projection extending from the edge of the first ductile sheet adjacent the at least one projection, there is at least one second additional projection extending from the edge of the first ductile sheet adjacent the at least one projection, the first and second additional projection extending into the at least one slot in the other structure to relatively locate the first ductile sheet and other structure, the first and second additional projections are on opposite sides of the projection.

Preferably the first ductile sheet comprises a plurality of projections on the edge of the first ductile sheet, a corresponding number of slots through the other structure, each projection extends through a corresponding one of the slots through the other structure, each projection being rotated such that the projection is arranged at an angle to the plane of the first ductile sheet to clamp the other structure between the edge of the first ductile sheet and the projection.

Preferably apertures are arranged at the sides of the root portion.

Preferably the at least one slot through the other structure comprises stub-slots extending perpendicularly from the centre of the at least one slot and ramps extending from the slot to the sub-slots to allow rotation of the root portion about the axis.

Preferably the ramps are arranged to define pawls with the ends of the slots to prevent rotation of the root portion in the direction to loosen the joint.

Preferably the additional projection extends from the to edge of the first ductile sheet by a distance equal to or less than the thickness of the second ductile sheet.

Preferably the second additional projection extends from the edge of the first ductile sheet by a distance equal to or less than the thickness of the second ductile sheet.

Preferably each projection is symmetrical about a plane extending perpendicularly to the edge of the first ductile sheet.

Preferably each root portion is symmetrical about a plane extending perpendicularly to the edge of the first ductile sheet.

Preferably the other structure comprises a second ductile sheet.

Preferably the joint comprises a third ductile sheet, at least one slot extending through the third ductile sheet, the at least one projection extending through the at least one slot in the third ductile sheet, the third ductile sheet being clamped between the edge of the first ductile sheet and the second ductile sheet.

Preferably the at least one projection is rotated such that the at least one projection is in a plane arranged perpendicularly to the plane of the first ductile sheet.

Preferably the ductile sheets are metallic sheets. Preferably the metallic sheets are stainless steel sheets or nickel alloy sheets.

The present invention also provides a method of joining a first ductile sheet to another structure comprising forming at least one projection on an edge of the first ductile sheet, the at least one projection being rotatable about an axis, the axis being arranged in the plane of the first ductile sheet and in a plane extending perpendicularly to the edge of the first ductile sheet, forming at least one slot extending through the other structure, inserting the at least one projection through the at least one slot in the other structure, rotating the at least one projection around the axis such that the at least one projection is in a plane arranged at angle to the plane of the first ductile sheet and such that the at least one projection abuts the other structure at both sides of the slot to clamp the other structure between the edge of the first ductile sheet and the at least one projection, forming a root portion on the at least one projection which extends from the projection into the main body of the first ductile sheet, the root portion extends for a predetermined distance from the edge of the first ductile sheet into the main portion of the first ductile sheet characterised by, forming at least one additional projection extending from the edge of the first ductile sheet adjacent the at least one projection, forming at least one second additional projection extending from the edge of the first ductile sheet adjacent the at least one projection, inserting the first and second additional projections into the at least one slot in the other structure to relatively locate the first ductile sheet and the other structure, the first and second additional projections are on the opposite sides of the projection.

BRIEF DESCRIPTION OF THE DRAWINGS

Preferably the method comprises forming a plurality of projections on the edge of the first ductile sheet, forming a corresponding number of slots through the other structure, inserting each projection through a corresponding one of the slots through the other structure, rotating each projection about the axis such that the projection is arranged at an angle to the plane of the first ductile sheet to clamp the other structure between the edge of the first ductile sheet and the projection.

Preferably the method comprises forming apertures through the first ductile sheet at the sides of the root portion.

Preferably the method comprises forming sub-slots extending perpendicularly from the centre of the at least one slot and forming ramps extending from the slot to the sub-slots to allow rotation of the root portion about the axis.

Preferably the additional projection extends from the edge of the first ductile sheet by a distance equal to or less than the thickness of the second ductile sheet.

Preferably the second additional projection extends from the edge of the first ductile sheet by a distance equal to or less than the thickness of the second ductile sheet.

Preferably the method comprises forming each projection symmetrically about a plane extending perpendicularly to the edge of the first ductile sheet.

Preferably the method comprises forming each root portion symmetrically about a plane extending perpendicularly to the edge of the first ductile sheet.

Preferably the method comprises forming the at least one projection by laser cutting.

Preferably the method comprises forming the at least one slot by laser cutting.

Figure 1:
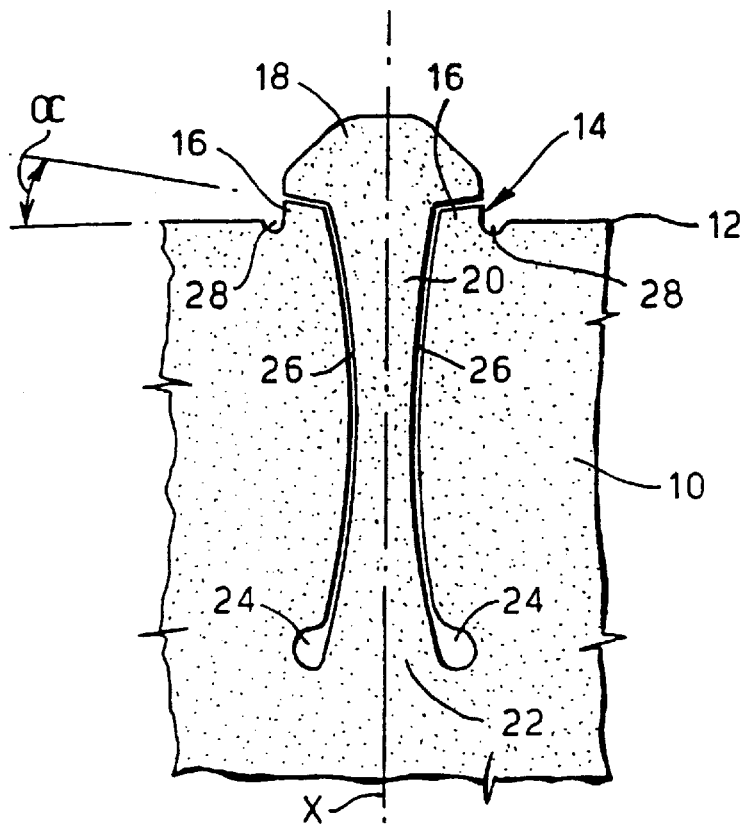

The present invention will be more fully described by way of example with reference to the accompanying drawings, in which:

FIG. 1 is a plan view of a portion of a first sheet metal component for forming a joint between two sheet metal components.

Figure 2:
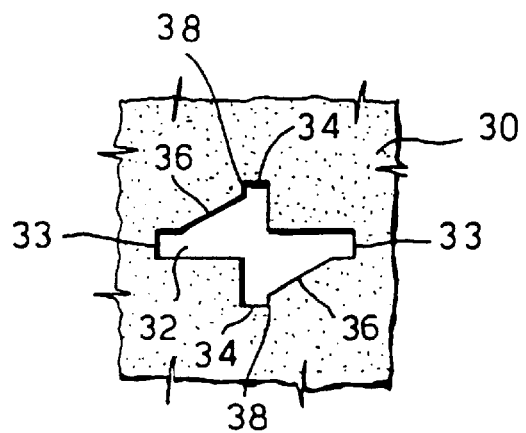

FIG. 2 is a plan view of a portion of a second sheet metal component for forming a joint between two sheet metal components.

Figure 3:
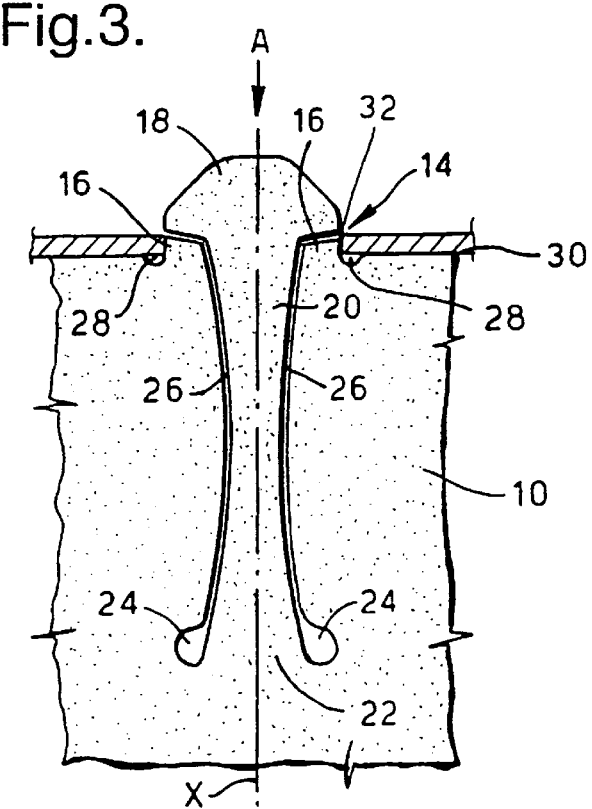

FIG. 3 is a plan view part way through the assembly of a joint between the first and second sheet metal components shown in FIGS. 1 and 2.

Figure 4:
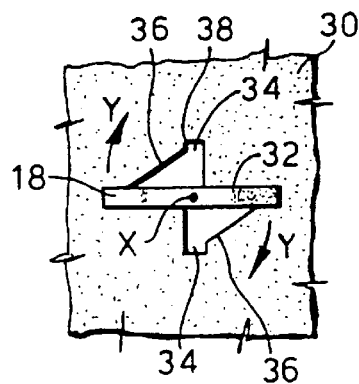

FIG. 4 is a view in the direction of arrow A in FIG. 3.

Figure 5:
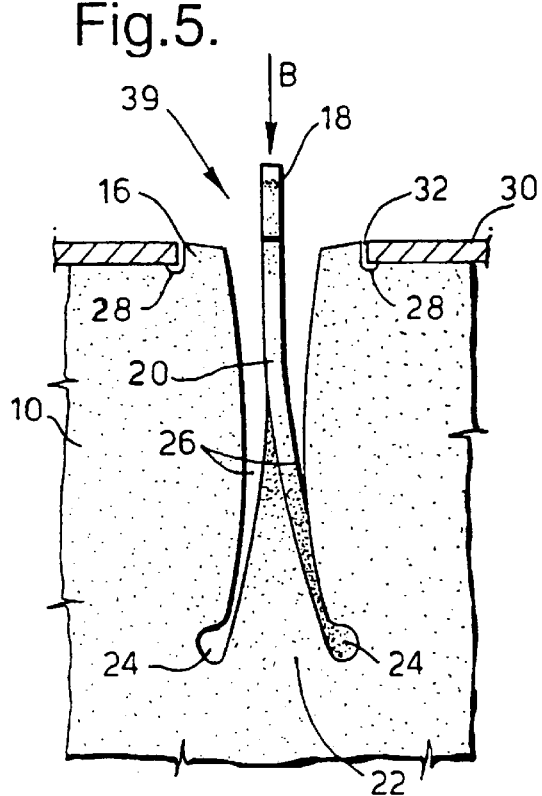

FIG. 5 is a plan view of a completed joint between the first and second sheet metal components shown in FIG. 1 and 2.

Figure 6:
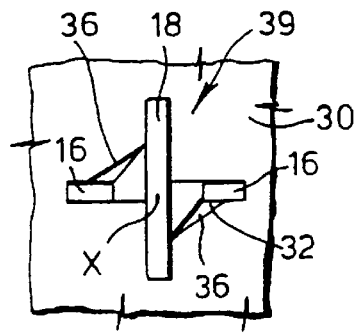

FIG. 6 is a view in the direction of arrow B in FIG. 5.

Figure 7:
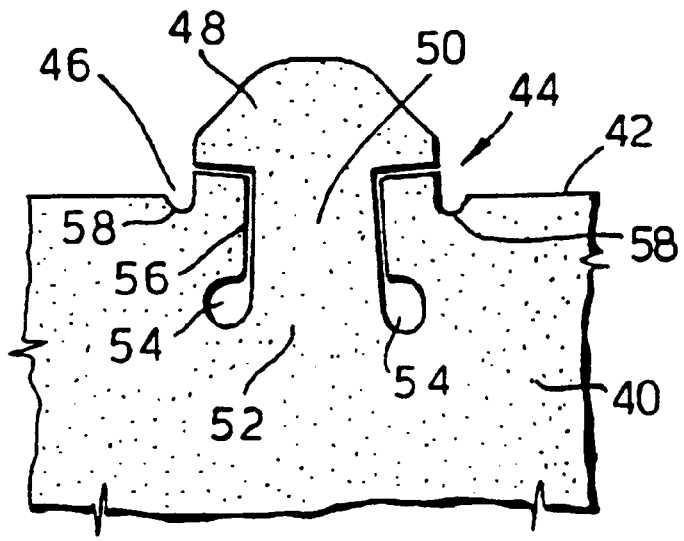

FIG. 7 is a plan view of a portion of an alternative first sheet metal component for forming a joint between two sheet metal components.

Figure 8:
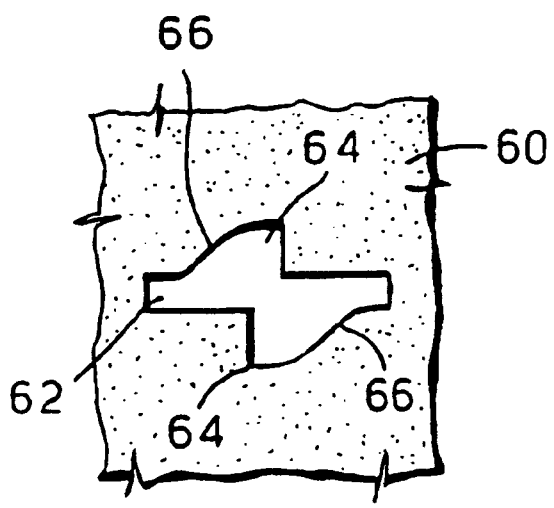

FIG. 8 is a plan view of a portion of an alternative second sheet metal component for forming a joint between two sheet metal components.

Figure 9:
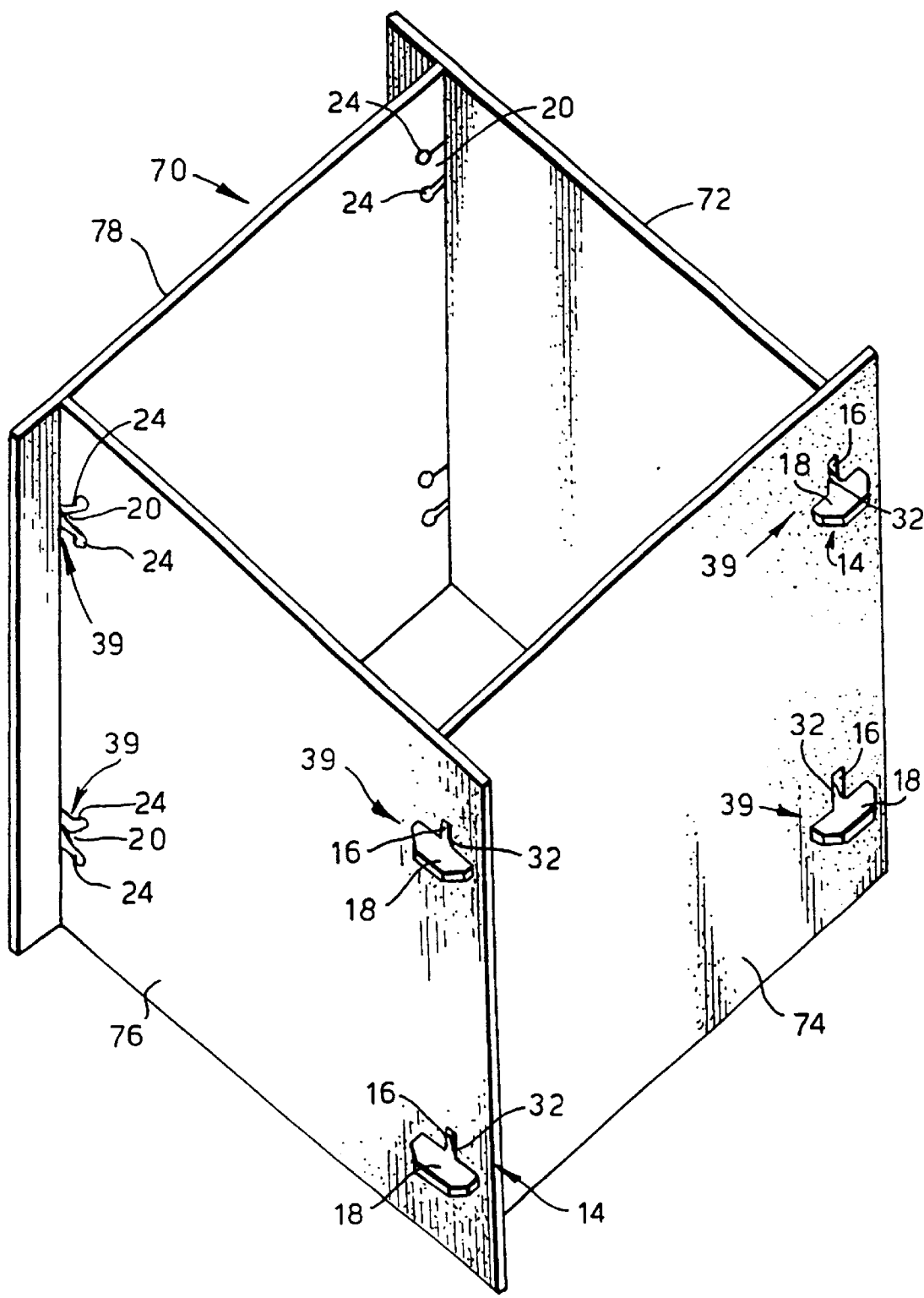

FIG. 9 is a perspective view of a box structure made using several joints according to the present invention.

A first metal sheet 10, as shown in FIG. 1, has an edge 12 and one or more projections 14 extend from the edge 12 of the first metal sheet 10. The projections 14 are spaced at suitable distances along the edge 12 of the first metal sheet 10.

Each projection 14 comprises two first portions 16 and a second portion 18. The first portions 16 of the projection 14 are fixed rigidly, and integrally, to the edge 12 of the first metal sheet 10 and the first portions 16 extend only a short distance from the edge 12. The distance is equivalent at the most to the thickness of a second metal sheet to which the first metal sheet 10 is to be joined. The first portions 16 are spaced apart along the edge 12.

The second portion 18 extends from the first portions 16 to a much greater distance, The second portion 18 is not fixed to the edge 12 of the first metal sheet 10, instead the second portion 15 has a soot portion 20 which extends between the first portions 16. The root portion 20 extends into the main body of the first metal sheet 10 by a predetermined distance where it is integrally fixed to the first metal sheet 10 at region 22. Two apertures 24 are cut through the first metal sheet 10, one is placed on a first side of the region 22 and one is placed on the other side of the region 22, these are to provide stress relief. A small clearance 26 is provided between the sides of the root portion 20 and the main body of the first metal sheet 10 and between the second portion 18 of the projection 14 and the first portions 16 of the projection 14. The second portion 18 of the projection 14 and the root portion 20 are symmetrical around a plane X arranged perpendicular to the edge 12 of the first metal sheet 10. Similarly the first portions 16 are arranged symmetrically around the plane X.

The projections 14 made are formed on the first metal sheet 10 by laser cutting the first metal sheet in the shape as shown, with the recesses 28 shown in FIGS. 1, 3 and 5 as well as the recesses 58 shown in FIG. 7, formed adjacent each projection.

A second metal sheet 30, as shown in FIG. 2, has one or more slots 32 extending through the second metal sheet 30. The slots 32 are spaced at suitable distances along the second metal sheet 30, equivalent to the distances between adjacent projections 14 on the first metal sheet 10.

Each slot 32 is substantially the same length, although slightly longer, than the length of the projections 14 along the edge 12 of the first metal sheet 10 in order to receive the respective projection 14 on the first metal sheet 10. Each slot 32 has two sub-slots 34 extending perpendicularly away from the centre of the slot 32. Each sub-slot 32 has ramps 30 cut out from opposite sides of the slot 32 to opposite sides of the sub-slots 34. The ramps 36 are so arranged to form pawls 38 at the ends of the sub-slots 34.

The slot 32, sub-slots 34 and ramps 36 are formed by laser cutting the second metal sheet 30 in the shape indicated.

A joint 39 is formed between the first metal sheet 10 and the second metal sheet 20, as shown more clearly in FIGS. 3 to 6, by firstly aligning each projection 14 on the first metal sheet 10 with the corresponding one of the slots 32 on the second metal sheet 30.

Each projection 14 is then inserted into the corresponding one of the slots 32 as shown more clearly in FIGS. 3 and 4. In this position the first portions 16 of each projection 14 engages the ends 33 of the corresponding slot 32 and accurately locates the first and second metal sheets 10 and 30 relative to each other.

The second portion 18 of each projection 14 is then rotated through 90° about an axis X, or about the plane X of symmetry of the projection 14, in the direction of arrows Y as shown in FIGS. 3 and 4, so that the second portion 18 of each projection 14 clamps the second metal sheet 30 rigidly against the edge 12 of the first metal sheet 10 as shown more clearly in FIGS. 5 and 6. The rotating of each second portion 18 about the axis X causes the corresponding root portion 20 to twist to accommodate the twisting of the second portion 18 of the projection 14. The sub-slots 34 and ramps 36 of each slot 32 in the second metal sheet 30 allow the root portion 20 and the second portion 18 of the corresponding projection 14 to rotate. The position of the sub-slots 34 and ramps 36 determines the direction in which the second portions 18 and root portions 20 are rotated. At the end of the angular movement of the second portion 18 of each projection 14, the corresponding root portion 20 moves into the pawls 38 at the ends of the sub-slots 34 and the pawls 36 lock the second portion 18 in position and prevents the second portion 18 rotating in the opposite direction to loosen the joint 39.

The amount of strain energy which may be applied to the joint 39 is dependent upon the position and the angle formed between the first portion 16 and second portion 18 of the projection 14, but also depends upon the length of the root portion 20 and the angle of rotation of the second portion 18.

As an example in the case of sheet metal components of 1.2 mm thickness, the length of the slot 32 in the second metal sheet 30 is 10 mm, the width of the slot 32 in the second metal sheet 30 is 1.2 mm. The sub-slots 34 extend about 2.4 mm from the slot 32 and the width of the sub-slots 34 is about 1.2 mm.

The first portions 16 extend 1.2 mm from the edge 12 of the first metal sheet 10 and the width of the first portions 16 is about 2.5 mm along the edge 12 of the first metal sheet 10.

The width of the second portion 18 of the projection 14 along the edge 12 of the first metal sheet 10 is about 10 mm, the length of the second portion 18 projecting away from the edge 12 is about 4 mm. The predetermined distance the root portion 20 extends into the main body of the first metal sheet 10 is about 22 mm, making the root portion 20 about 23.2 mm long in total. The width of the root portion 20 adjacent the second portions 18 is about 5 mm and the width of the root portion 20 at region 22 is about 6.5 mm. The clearance n 26 is about 0.15 mm.

These values, except for the clearance, may be scaled for other thicknesses of sheet metal.

A further first metal sheet 40, as shown in FIG. 7, has an edge 42 and one or more projections 44 extend from the edge 42 of the first metal sheet 40. The projections 44 are spaced at suitable distances along the edge 42 of the first metal sheet 40.

Each projection 44 comprises two first portions 46 and a second portion 48. The first portions 46 of the projection 44 are fixed rigidly, and integrally, to the edge 42 of the first metal sheet 40 and the first portions 46 extends only a short distance from the edge 42. The distance is equivalent at the most to the thickness of a second metal sheet to which the first metal sheet 40 is to be joined. The first portions 46 are spaced apart along the edge 42. The second portion 48 extends from the first portions 46 to a much greater distance.

The second portion 48 is not fixed to the edge 42 of the first metal sheet 40, instead the second portion 48 has a root portion 50 which extends between the first portions 46. The root portion 50 extends into the main body of the first metal sheet 40 by a predetermined distance where it is integrally fixed to the first metal sheet 40 at region 52. Two apertures 54 are cut through the first metal sheet 40, one is placed on a first side of the region 52 and one is placed on the other side of the region 52. A small clearance 56 is provided between the sides of the root portion 50 and the main body of the first metal sheet 40 and between the second portion 46 of the projection 44 and the first portions 46 of the projection 44. The second portion 48 of the projection 44 and the root portion 50 are symmetrical around a plane X arranged perpendicular to the edge 42 of the first metal sheet 40. Similarly the first portions 46 are arranged symmetrically around the plane X.

The projections 44 are formed on the first metal sheet 40 by laser cutting the first metal sheet 40 in the shape as shown. The first projection portions 46, the second projection 48 and the root portion 50 are formed by laser cutting the first metal sheet 40 along the lines indicating the clearance 56. The apertures 52 are also formed by laser cutting the first metal sheet 40. The root portion 50 is shorter than that in FIG. 1 and for example in the case of a metal sheet 1.2 mm thick the predetermined length of the root portion 50 is 6 mm.

A second metal sheet 60, as shown in FIG. 8, has one or more slots 62 extending through the second metal sheet 60. The slots 62 are spaced at suitable distances along he second metal sheet 60, equivalent to the distances between adjacent projections 44 on the first metal sheet 40.

Each slot 62 is substantially the same length, although slightly longer, than the length of the projections 44 along the edge 42 of the first metal sheet 40 in order to receive the respective projection 44 on the first metal sheet 40. Each slot 62 has two sub-slots 64 extending perpendicularly away from the centre of the slot 62. Each slot 62 has ramps 66 cut out from opposite sides of the slot 62 to opposite sides of the sub-slots 64.

The slot 62, sub-slots 64 and ramps 66 are formed by laser cutting the second metal sheet 60 in the shape indicated. This does not have a locking pawls and therefore may not be used in circumstances where there may be vibrations to loosen the joint.

Typical safe tensile load capacity for stainless steel metal sheets 1.2 mm thick is about 900N for joints shown in FIGS. 7 and 8.

The number of joints between the first and second metal sheets is selected to provide the total load capacity, tensile or shear, appropriate for the particular application. However, there is a physical restraint on how many joints may be provided between two metal sheets and in such circumstances other joints may be required to support these joints, for example welding, brazing, soldering, rivets, nuts and bolts etc.

An advantage of the joint is that it provides accurate location and fixation of the metal sheets in preparation for another process, for example before producing a welded joint. Thus the joint may remove the need for expensive jigs and fixtures to locate and fix metal sheets together.

The joint may handle loads much greater than the weight of the assembly of the metal sheets. The joint is capable of providing a clamping load and its symmetry of construction create stability. The invention has been tested on stainless steel, nickel alloys and nickel based super alloys for sheet metal thickness between 0.5 mm and 2.0 mm.

The joints are cheap and easy to produce using laser machining. The joints provide accurate location and retention of metal sheets prior to fabrication. The symmetrical features of the joint and the rotation minimizes unlocking. An unlocking feature prevents unlocking or loosening of the joint due to vibrations etc. The geometry is scaleable for all metal sheet thickness.

The joints may be used in many different industries for example motor vehicles, aeroplanes, gas turbine engines, ships, railway carriages, railway locomotives, light industry etc. In particular the joints may be used to manufacture gas turbine engine nacelles, casings, thrust reverser cascades, honeycomb or box type structures from metal sheets.

A box structure 70, shown in FIG. 9, is constructed from four metal sheets 72, 74, 76 and respectively. One edge of each sheet 72, 74, 76 and 78 is provided with two projections 14, each of which comprises two first projections 16 and one second projection 18. Each of the sheets 72, 74, 76 and 78 is provided with two slots 32. The projections 14 on each of the metal sheets 72, 74, 76 and 78 is aligned with and passed through the corresponding slots 32 in the adjacent metal sheets 74, 76, 78 and 72 respectively. The second projections 18 on each metal sheet 72, 74, 76 and 78 are then rotated through 90° to clamp all the metal sheets 72, 74, 76 and 78 together to produce the rigid box structure 70.

The joint features may formed by any other suitable process which produces narrow, about 0.15 mm, clearances between the first and second portions of the projection and between the root portion and the main body of the metal sheet which are perpendicular to the surface of the metal sheets and which have a milled edge finish.

The sheet metal may be a metal, an alloy or an intermetallic alloy. The invention is applicable to sheet metal made of ductile metals, however the invention may be applicable to other sheet materials made of other ductile materials.

Although the invention has been described as providing a joint between two ductile material sheets the invention provides a joint between three or more ductile material sheets. In the case of three sheets, the projections are designed such that the first projections pass through and locate in the other two sheets and the second projections clamp on the sheet furthest from the edge of the sheet from which the projections extend. Similarly for providing a joint between four or more ductile material sheets.

Although the invention has been described as providing a joint between two ductile material sheets, the invention provides a joint between at least one ductile material sheet is and other structure or materials. In this case the projection on the ductile material sheet passes through a slot through the other structure or material, the other structure may be for example a casting etc.

Although the invention has been described as requiring the projections to be rotated through 90° in order to clamp the second ductile sheet between the edge of the first ductile sheet and the projection, the projection may be rotated through other suitable angles less than 90° which enable the projection to abut the second ductile sheet at both sides of the slot.

What is claimed is:

1. A joint for joining a first ductile sheet, having edges and a main body, to another structure comprising at least one projection on one of said edges of the first ductile sheet, the at least one projection being rotatable about an axis, said axis being arranged in the plane of the first ductile sheet and in a plane extending perpendicularly to said one of said edges of the first ductile sheet, at least one slot extending through said another structure, the at least one projection extending through the at least one slot of said another structure, the at least one projection being rotated such that the at least one projection is in a plane arranged at an angle to the plane of the first ductile sheet and the at least one projection abutting said another structure at both sides of the slot to clamp said another structure between the edge of the first ductile sheet and the at least one projection, the at least one projection comprising a root portion which extends from the projection into said main body of said first ductile sheet, the root portion extending for a distance from the said one of said edges of the first ductile sheet into said main body of the first ductile sheet, wherein there is a first additional projection extending from said one of said edges of the first ductile sheet adjacent the at least one projection, there being a second additional projection extending from the said one of said edges of the first ductile sheet adjacent the at least one projection, the first and second additional projections extending into the at least one slot in the said another structure to relatively locate the first ductile sheet and the said another structure, the said additional projections being on opposite sides of the at least one projection.

2. A joint as claimed in claim 1 wherein the first ductile sheet comprises a plurality of projections on said one of said edges of the first ductile sheet, a corresponding number of slots through said another structure, each projection extending through a corresponding one of the slots through the said another structure, each projection being rotated such that the projection is arranged at an angle to the plane of the first ductile sheet to clamp the said another structure between the edge of the first ductile sheet and the projection.

3. A joint as claimed in claim 1 wherein apertures are arranged at the sides of the root portion.

4. A joint as claimed in claim 1 wherein the at least one slot through the said another structure comprises sub-slots extending perpendicularly from the center of the at least one slot and ramps extending from the slot to the sub-slots to allow rotation of the root portion about the axis.

5. A joint as claimed in claim 4 wherein the ramps are arranged to define pawls with the ends of the sub-slots to prevent rotation of the root portion in a direction to loosen the joint.

6. A joint as claimed in claim 5 wherein the first additional projection extends from the edge of the first ductile sheet by a distance equal to or less the the thickness of the said another structure.

7. A joint as claimed in claim 6 wherein the second additional projection extends from the edge of the first ductile sheet by a distance equal to or less than the thickness of the said another structure.

8. A joint as claimed in claim 5 to wherein each projection is symmetrical about a plane extending perpendicularly to the edge of the first ductile sheet.

9. A joint as claimed in claim 8 wherein each root portion is symmetrical about a plane extending perpendicularly to the edge of the first ductile sheet.

10. A joint as claimed in claim 9 wherein the said another structure is a second ductile sheet.

11. A joint as claimed in claim 10 comprising a third ductile sheet, at least one slot extending through the third ductile sheet, the at least one projection extending through the at least one slot in the third ductile sheet, the third ductile sheet being clamped between the edge of the first ductile sheet and the second ductile sheet.

12. A joint as claimed in claim 10 wherein the ductile sheets are metallic sheets.

13. A joint as claimed in claim 12 wherein the metallic sheets are stainless steel sheets.

14. A joint as claimed in claim 12 wherein the metallic sheets are nickel alloy sheets.

15. A joint as claimed in claim the 1 wherein the at least one projection is rotated such that the at least one projection is in a plane arranged perpendicularly to the plane of the first ductile sheet.

16. A method of joining a first ductile sheet having edges to another structure comprising forming at least one projection on an edge of the first ductile sheet, the at least one projection being rotatable about an axis, the axis being arranged in the plane of the first ductile sheet and in a plane extending perpendicularly to said edge of the first ductile sheet, forming at least one slot extending through the said another structure, inserting the at least one projection through the at least one slot in the said another structure, rotating the at least one projection around the axis such that the at least one projection is in a plane arranged at an angle to the plane of the first ductile sheet in such that the at least one projection abuts the said another structure at both sides of the slot to clamp the said another structure between the edge of the first ductile sheet and the at least one projection, forming a root portion of the at least one projection which extends from the projection into the main body of the first ductile sheet, the root portion extending for a distance from the edge of the first ductile sheet into the main body of the first ductile sheet, the method including the step of forming at least a first additional projection extending from the edge of the first ductile sheet adjacent the at least one projection, forming at least one second additional projection extending from the edge of the first ductile sheet adjacent to the at least one projection, inserting the first and second additional projections into the at least one slot in the other structure to relatively locate the first ductile sheet and the other structure, the first and second additional projections being on opposite sides of the at least one projection.

17. A method as claimed in claim 16 comprising the steps of forming a plurality of projections on the edge of the first ductile sheet, forming a corresponding number of slots through the said another structure, inserting each projection through a corresponding one of the slots through the said another structure, rotating each projection about the axis such that the projection is arranged at an angle to the plane of the first ductile sheet to clamp the other structure between the edge of the first ductile sheet and the projection.

18. A method as claimed in claim 16 comprising the step of forming apertures through the first ductile sheet at the sides of the root portion.

19. A method as claimed in claim 16 comprising forming subslots extending perpendicularly from the center of the at least one slot and forming ramps extending from the slot to the sub-slots to allow rotation of the root portion about the axis.

20. A method as claimed in claim 16 wherein the additional projection extends from the edge of the first ductile sheet by a distance equal to or less than the thickness of the said another structure.

21. A method as claimed in claim 20 wherein the second additional projection extends from the edge of the first ductile sheet by a distance equal to or less than the thickness of the said another structure.

22. A method as claimed in claim 16 comprising forming each projection symmetrically about a plane extending perpendicularly to the edge of the first ductile sheet.

23. A method as claimed in claim 22 comprising the step of forming each root portion symmetrically about a plane extending perpendicularly to the edge of the first ductile sheet.

24. A method as claimed in claim 16 comprising forming the at least one projection by laser cutting.

25. A method as claimed in claim 16 comprising forming the at least one slot by laser cutting.

26. A method as claimed in claim 16 comprising forming the at least one root portion by laser cutting.

* * * * *